Fig. 2

INVENTOR.
HOLLIS C. HODGKINS
BY James J. Long
AGENT

Oct. 20, 1953     H. C. HODGKINS     2,655,977
COLLAPSIBLE BUILDING DRUM

Filed Sept. 21, 1951                         6 Sheets-Sheet 3

INVENTOR.
HOLLIS C. HODGKINS
BY *James J. Long*

AGENT

Patented Oct. 20, 1953

2,655,977

UNITED STATES PATENT OFFICE 2,655,977

COLLAPSIBLE BUILDING DRUM

Hollis C. Hodgkins, Chippewa Falls, Wis., assignor to United States Rubber Company, New York, N. Y., a corporation of New Jersey Application September 21, 1951, Serial No. 247,649

10 Claims. (Cl. 154—9)

This invention relates to an improved building drum, and more particularly it relates to an improved building drum, for making pneumatic tires, barrels, or other generally annular articles, that can be collapsed rapidly to a compact form for removal of the article.

Increase in cruising speed and the desire to improve the riding ease and comfort of the present day automobile have led to a demand for more uniform tires than those that have been considered adequate in the past. Since the uniformity of a tire depends in large measure upon the accuracy and precision with which the carcass is built, there arises also a concomitant demand for a tire building drum built to precision standards, and capable of retaining its accuracy throughout a reasonable period of use.

Accordingly, it is a principal object of the present invention to provide a collapsible building drum for making tires and the like, having an improved expanding and collapsing mechanism that accurately positions the working surfaces of the drum.

Another object is the provision of a building drum that retains its accuracy over a prolonged period of service.

Still another object is to provide a drum expanding and collapsing mechanism that is essentially unaffected by rotation of the drum.

A further object of the invention is the provision of a building drum in which the working surfaces are securely maintained in operative position, but yet may be rapidly collapsed when desired.

Still a further object is the provision of a collapsible building drum that expands and contracts with a minimum of wear and strain on the collapsing mechanism.

An additional object of the invention is to provide a drum collapsing mechanism which is especially adaptable to symmetrical construction of the various parts, so that the parts may be readily interchanged or replaced.

It is another object to provide a drum collapsing mechanism that is adapted to accommodate drum segments or working surfaces of various sizes and shapes, so that the diameter or shape of the building surface of the drum may be varied as desired within definite limits.

The manner in which the invention accomplishes the foregoing objects, as well as additional objects and advantages, will be made manifest in the following detailed description of the invention, which is intended to be read with reference to the accompanying drawings, wherein.

According to the invention, a building drum is provided with a plurality of outer arcuate segments forming the building surface of the drum, which can be collapsed or expanded radially inwardly or outwardly with respect to a central relatively fixed hub, by means of a radially acting actuating means secured to the hub and to at least some of the segments. The hub of the drum is adapted to be attached to the shaft of the usual tire building machine which rotates the drum in either direction as the tire is assembled on the surface of the drum in accordance with conventional practice. After the tire carcass is built up on the surface of the drum, the drum is collapsed to a compact form, permitting removal of the carcass without distortion or injury.

Referring to the drawings, the improved drum includes three arcuate key segment assemblies 10, 11, 12 and three alternately disposed intermediate larger arcuate segment assemblies 13, 14, 15 which together define, when the drum is in the expanded position, an uninterrupted smooth circular building surface 16 formed by the outer arcuate surfaces of the segment assemblies. Each of the smaller or key segment assemblies 10, 11, 12 is slidably mounted at its inner- or under-side on one of the axially disposed segment supporting plates 17, 18, 19, and the larger or principal segment assemblies 13, 14, 15 similarly are each slidably mounted on one of the axially disposed segment supporting plates 20, 21, 22.

Figure 2:
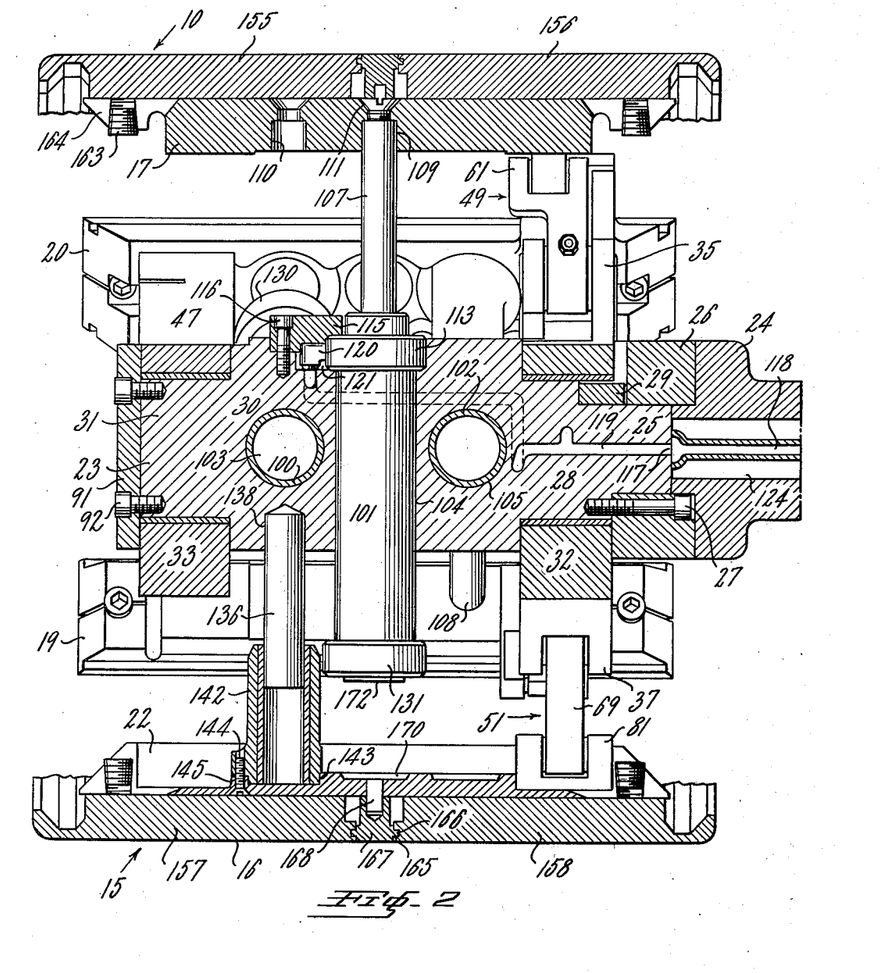
Fig. 2 is a side elevational view of the drum taken in section substantially along the line 2—2 of Fig. 1, with parts broken away.
Figure 3:
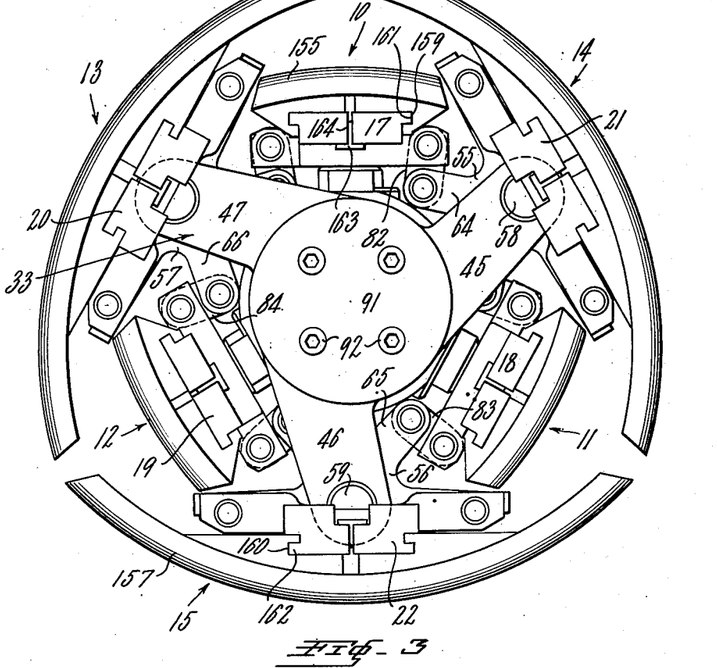
Fig. 3 is a front elevational view of the drum in the collapsed position.
Figure 4:
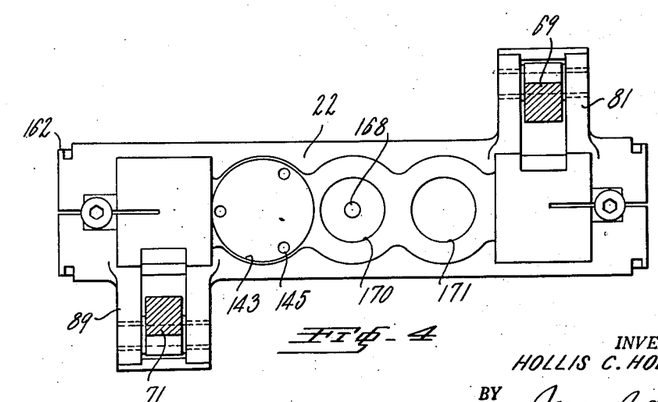
Fig. 4 is an axial plan view of a portion of the drum, taken partly in section along line 4—4 of Fig. 1, with parts broken away.
Figures 5, 6:
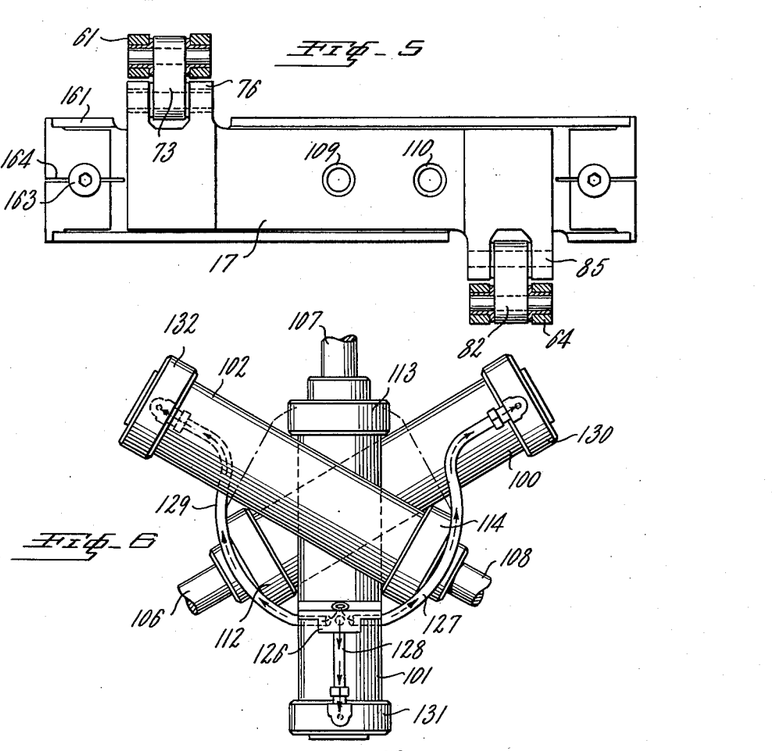
Fig. 5 is a similar view of another portion of the drum taken substantially along the line 5—5 of Fig. 1.
Fig. 6 is a fragmentary rear elevational view of actuating cylinders within the drum, with parts shown in outline.
Figure 7:
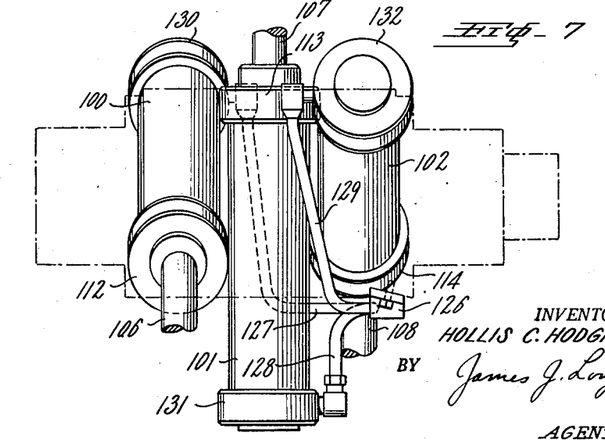
Fig. 7 is a side elevational view of the parts shown in Fig. 6.
Figure 8:
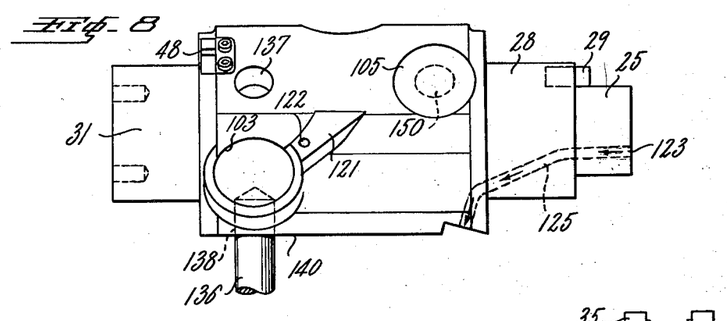
Fig. 8 is a side elevational view of a central hub of the drum assembly, with parts broken away and parts shown in outline.
Figures 9, 10:
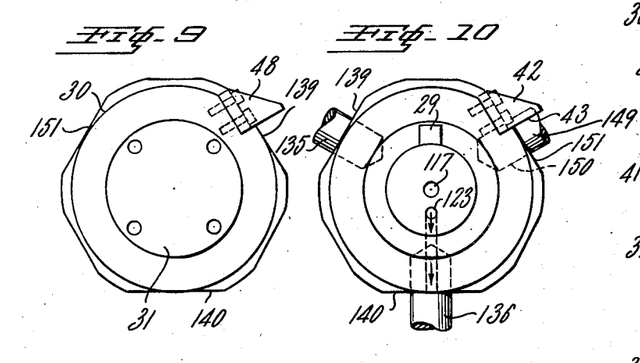
Figs. 9 and 10 are similar views of the hub shown in Fig. 8, viewed from the front end and rear end, respectively.

The segment supporting plates 17—22 serve for attachment of an expanding and contracting mechanism, to be described below, by which the segments are radially movably supported from a central generally circular hub member or shaft 23 (Fig. 2) axially disposed within the interior of the drum. Toward its inner end, that is, toward the end of the drum adapted to be mounted on the end of a rotary shaft 24 extending from the usual tire building machine (not shown), the central hub 23 has a section 25 of reduced diameter, over which there is fitted a surrounding attaching collar 26, rigidly secured to the hub 23 by means of bolts 27 passing through the collar 26 into a portion 28 of the hub 23 of larger diameter. The hub 23 is also keyed, as at 29, to the attaching collar 26. The attaching collar 26 is adapted to be detachably secured to the end of the building machine 24 by suitable means, such as studs or bolts (not shown) or by an arrangement such as shown in my co-pending application Serial No. 146,312, filed February 25, 1950, now Patent No. 2,583,650, dated January 29, 1952, assigned to the same assignee as the present application, whereby the drum is readily mounted on or dismounted from the building machine shaft, as desired.

Figure 11:
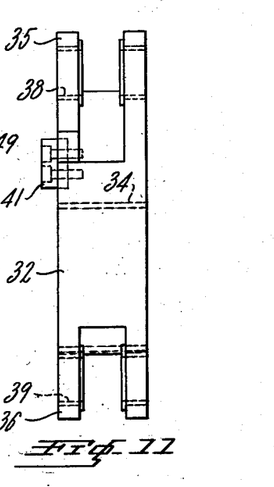
Figs. 11 and 12 are side and front elevational views, respectively, of a collar forming part of the collapsing mechanism.
Figures 12, 13, 14:
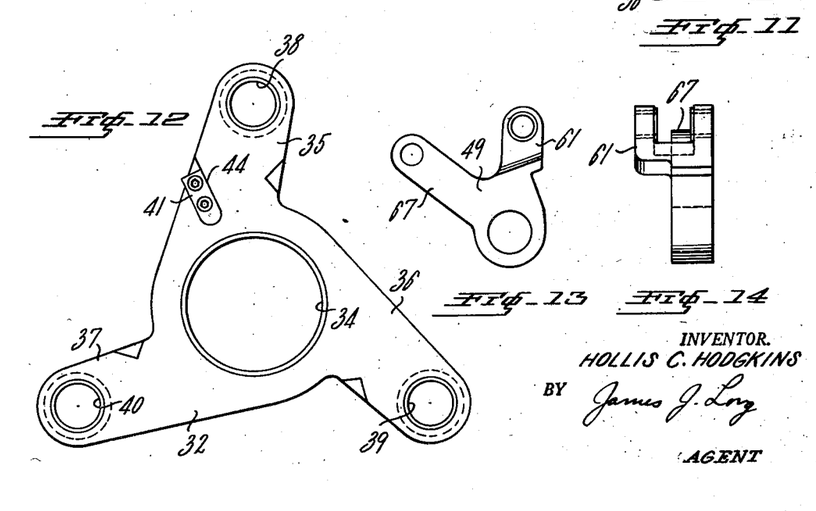
Figs. 13 and 14 are front and side elevational views, respectively, of a control yoke forming part of the collapsing mechanism; and, Figs. 15 and 16 are fragmentary front elevational views of the drum in an expanded and collapsed position, respectively, showing larger working surfaces substituted for the original working surfaces.

The circular portion 28 of the hub 23 is of reduced diameter compared to the central portion 30 of the hub, and a similarly reduced circular portion 31, spaced from the portion 28, is provided at the front or outer end of the hub. The hub portions 28 and 31 accommodate inner and outer spaced rotary collar members 32 and 33 respectively. As indicated most clearly in Figs. 11 and 12, the collar 32 has a circular central opening 34 for rotatably mounting the collar on the reduced portion 28 of the hub. Three radial arms 35, 36, 37 extend outwardly from the collar to form a spider-like arrangement. The arms are canted or biased somewhat in a clockwise direction as viewed in Figs. 1 and 12, and each arm is forked towards its outer end and is provided with axial openings 38, 39, 40 therethrough for accommodating portions of the expanding and collapsing linkage that will be described below. To limit the rotation of the spider or collar 32 with respect to the hub in such manner as to positively locate the collar 32 at a definite position when the drum is in the expanded operative condition, a radially aligned, rigidly secured stop 41 projects axially from one face of the collar. The spider or collar 32 is mounted on the reduced inner portion 28 of the hub 23 with this projecting stop 41 projecting toward the central enlarged portion 30 of the hub, and the stop 41 is so spaced from the central axis of the assembly as to engage a cooperating projecting stop 42 fixed to the periphery of the enlarged portion 30 of the hub 23 at the inner end thereof. The stop 42 has a radially aligned face 43 designed to meet one face 44 of the stop 41 on the collar 32, and is so positioned as to positively halt rotation of the inner collar or spider 32 at a definite desired location.

Figure 1:
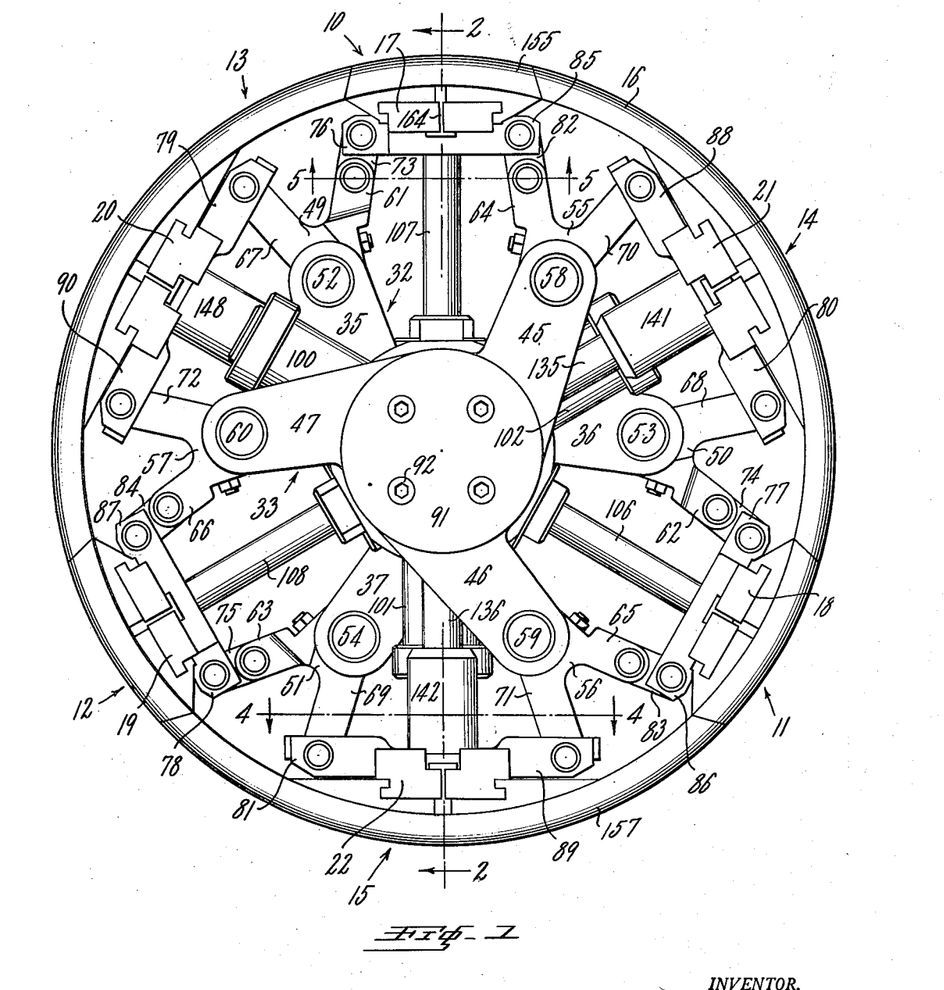
Fig. 1 is a front elevational view of a collapsible tire building drum of the invention in the expanded position.

The remaining collar or spider 33 is constructed similarly to the collar 32, but is oppositely disposed in assembly, so that its radial arms 45, 46 and 47 are canted in a counter-clockwise direction as viewed in Fig. 1. A stop (not shown) similar to the stop 41 is provided on the inner face of the outer collar or spider 33, and such stop cooperates with a stop 48 fixed at the opposite end of the enlarged portion 30 of the hub 23, in a manner analogous to the stop 42, so as to position the outer rotary collar or spider 33 in the same manner as described in connection with the inner collar 32.

For securing the various segment supporting plates 17—22 to the inner and outer rotary collars or spiders 32, 33 which guide the segments in their expanding and collapsing movement, there are provided, on each of the arms 35, 36, 37 of the inner spider 32, generally V-shaped control links or yokes 49, 50, 51 pivotally secured thereon by pivot pins 52, 53, 54 passing through the joint or apex of the V and through the respective openings 38, 39, 40 toward the outer ends of the spider arms. Similarly, outer control yokes 55, 56, 57 are pivotally mounted by means of pivot pins 58, 59, 60 on the end of the arms 45, 46, 47 of the outer collar or spider 33. Each control yoke 49—51, 55—57 includes an outwardly extending forked arm 61—66 and an outwardly extending single arm 67—72 which carry at their ends pivotal attachments to the various segments supporting plates 17—22 in such manner that each plate is pivotally secured toward one end to a forked arm of a control yoke and toward the other end to a single arm of a control yoke. Thus, forked arms 61, 62, 63 of the control yokes 49, 50, 51 carried by the inner spider 32, are pivotally attached by means of intermediate pivotal tie links 73, 74, 75, respectively, to brackets 76, 77, 78 which extend laterally from the key segment supporting plates 17, 18, 19 toward the axially inner end thereof. The opposed single arms 67, 68, 69 of these yokes are pivotally secured to brackets 79, 80, 81 which extend laterally from the larger segment supporting plates 20, 21, 22 toward the axially inner end thereof. In this way, the control yokes 49, 50, 51 serve to connect the key segments and the larger segments to each other toward their axial inner end to control the motion of the two groups of segments in a manner that will be described in detail below.

In an analogous manner, the two sets of segments are connected together toward their axially outer end, and also connected to the front spider 33, by the front control yokes 55, 56, 57. Thus, the forked arms 64, 65, 66 of the front yokes 55, 56, 57 carry pivotal tie links 82, 83, 84 that are pivotally attached to brackets 85, 86, 87 extending laterally from the key segment supporting plates 17, 18, 19 toward the outer or front end thereof, while the single arms 70, 71, 72 of these yokes are pivotally attached to 88, 89, 90 of the larger segment supporting plates 20, 21, 22 toward the front end thereof.

The inner or rear yokes 49, 50, 51 thereby bridge from the key segments to the larger segments at the rear of the drum, while the outer or front yokes 55, 56, 57 bridge from the key segments to the larger segments at the front of the drum, in a similar manner, but in an opposite sense, by reason of the reverse disposition of the front and rear spiders and yokes, compared to each other.

In assembly, the rear or inner collar or spider 32 is maintained in its position and restrained against axial movement on the reduced portion 28 of the hub 23 between the mounting collar 26 and the enlarged portion 30 of the hub by the bolts 27, while the outer or front collar or spider 33 is maintained in position and restrained against axial movement between the enlarged portion 30 of the hub and an outer retaining plate 91 that is held in place by means of bolts 92 passing through the retaining plate into the front face of the reduced portion 31 of the hub.

For imparting the desired radial collapsing and expanding motion to the segments, there are provided three radially disposed fluid-operated actuating cylinders 100, 101, 102 that are mounted in radially disposed axially spaced bores 103, 104, 105 passing through the enlarged portion 30 of the hub 23 along radial planes disposed at an angle of 120° to each other. The operating cylinders 100, 101, 102 are connected to the key segment supporting plates 18, 17, 19, respectively, by means of piston rods 106, 107, 108 extending from the front end of the cylinders. At their outer ends, the piston rods are fitted into suitably drilled holes 109 or 110 in the segment supporting plates, wherein they are secured by a screw 111. The bores 103, 104, 105 in which the cylinders 100, 101, 102 are disposed, are counterbored at one end to a larger diameter so that they snugly accommodate enlarged front end caps 112, 113, 114 of the cylinders, with the outer face of such caps flush with the outer surface of the enlarged portion 30 of the hub 23, and each cylinder is maintained firmly in place within the hub by means of a keeper, such as keeper 115, secured in place by a screw 116, passing into the hub.

To actuate the operating cylinders in such manner as to draw the piston rods and segment assemblies inwardly radially to collapse the drum, there is provided at the center of the inner end face of the hub 23 in engagement with the face of the machine shaft 24, a fluid supply opening 117 that is in communication with a central axial fluid supply line 118 within the hub 24, and that leads to internal fluid passageways 119 that pass through the hub and lead into the respective front caps 112—114 of the various cylinders 100—102. At each cylinder a connecting elbow, such as elbow 120, carried by the cylinder end cap, is disposed within a milled slot on the surface of the enlarged portion of the hub, such as slot 121, and is therein maintained firmly in place against an opening, such as opening 122, from the passageway 119 by the keeper 115. Fluid supplied to the front end of the cylinders in this manner actuates a piston (not shown) within each cylinder to produce a collapsing movement. For actuating the cylinders in a radially outward direction to expand the drum there is provided an additional opening 123 in the inner end face of the hub that is supplied with actuating fluid from an annular passageway 124 passing axially within the hub 24, and leading to a passageway 125 that extends axially and radially through the hub into communication with a distributing block 126 that is secured at the surface of the enlarged portion 30 of the hub. The distributing block 126 serves to distribute the actuating fluid to three external fluid lines 127, 128, 129 leading to rear end caps 130, 131, 132 of the cylinders 100, 101, 102. Fluid supplied to the rear end of the cylinders in this manner actuates the piston rods and segment assemblies outwardly simultaneously for the expanding movement. It will be understood that application of fluid pressure to the supply passageways 118, 124 within the hub 24 is controlled by the usual control valve (not shown), and that the various passageways serve either as inlets or outlets for the actuating fluid, to either expand or collapse the drum, depending on the position of the control valve.

To further guide and steady the principal segment assemblies 13, 14, 15 in their radial expanding and collapsing movement, there is associated with each of these segments a telescoping guide arrangement extending from the hub to the supporting plates of the segments. The telescoping guides for the segment assemblies 14 and 15 include radially extending guide studs 135, 136 rigidly fitted into holes 137, 138 drilled into plane faces 139, 140 on the enlarged portion 30 of the hub 23 toward the axially outer end thereof. Toward their radially outer ends the guide studs 135, 136 extend slidably into radial bearing sleeves 141, 142 that are secured at their outer ends into a recess on the underside of the segment supporting plate, such as recess 143 on the inner surface of the segment supporting plate 22 of the segment assembly 15, as by screws 144 passing through holes 145 disposed around the periphery of the recess 143, into a mounting flange at the base of the sleeve. The remaining large segment assembly 13 similarly has a guide sleeve 148 extending radially inwardly from the inner surface of its supporting plate 20, and slidably interfitted with a similar radial guide stud 149 rigidly fitted at its inner end into a radial hole 150 drilled in a plane surface 151 of the enlarged portion 30 of the hub 23, toward the axially inner end thereof.

The portions of the segment assemblies which define the building surface 16 of the drum include segment halves, such as halves 155, 156 of the key segment 10, and halves 157, 158 of larger segment 15, disposed toward either side of a circumferential center line of the building surface. At their outer marginal edges the segment halves are so undercut and shaped as to provide for the desired shaping of the bead area of the tire as it is built up on the drum. The segment halves are slidably mounted for adjusting movement in an axial direction on the respective supporting plates of the various segments. For this purpose, inwardly extending portions of the segment halves are provided with undercut recesses or slots, such as slots 159, 160 of segment halves 155, 157, into which extend slidably cooperating projections of the segment supporting plates, such as projections 161, 162 of the supporting plates 17, 22. The segment halves may be securely positioned at a desired distance from the circumferential center line of the building surface by tightening tapered screws extending into slotted ends of the segment supporting plates, such as screw 163 threaded through slotted end portion 164 of the segment supporting plate 17. As the tapered screw is turned into the slotted portion, the segment supporting plate is caused to expand outwardly, thereby tightening the projecting guide of the supporting plate in the sliding slot of the segment half.

The inner edge of each segment half is provided with an inwardly extending slot extending along the edge face of the segment half circumferentially of the drum and slightly spaced from the working surface 16 of the drum, such as slot 165 in the edge of segment half 158. Such slots are adapted to receive laterally projecting lips of spacer pieces, such as lip 166 of spacer piece 167, that can be interposed between the segment halves along the circumferential center line of the drum for the purpose of varying the width of the building surface. The spacer pieces have the same arcuate length as the segment into which they are adapted to fit, and they may have various widths, depending on the desired width of the drum working surface. The outer surface of the spacer pieces is flush with the outer surface of the segment halves when in position, and the inner surface of the spacer piece is provided with spaced radial holes, for receiving guide pins, such as pin 168, that extend outwardly radially from the segment supporting plates at spaced intervals along the circumferential center line of the drum, to serve as a guide in positioning the spacer pieces in place.

The inner surface of the supporting plates of the larger segment assemblies, such as plate 22, is also provided with recesses, such as recesses 170, 171 which are adapted to receive projecting portions of the rear end caps of the operating cylinders in radial alignment therewith, when the drum is in the collapsed position, such as projection 172 from the end cap 131 of the central cylinder 101.

The operation of the expanding and collapsing mechanism will now be described. To collapse the drum, fluid pressure is applied to the front ends of the operating cylinders 100, 101, 102 from the fluid supply line 118 within the shaft 24 of the building machine, into the central opening 117 in the end face of the hub 23 of the drum and through internal passageways 119 within the hub. This causes the piston rods 106, 107, 108 and attached key segment supporting plates 17, 18, 19 to move inwardly, thereby moving the key segment assemblies 10, 11, 12 radially inwardly simultaneously. The inward movement of the key segment assemblies causes, through the small pivotal tie links 73, 74, 75 a clockwise tilting of the rear control yokes 49, 50, 51 about their pivotal connections 52, 53, 54 to the arms of the rear rotary collar or spider 32, accompanied by a simultaneous counter-clockwise tilting, through connecting pivotal tie links 82, 83, 84 of the front control yokes 55, 56, 57 about their pivotal connections 58, 59, 60 to the arms of the front spider 33. The inward movement of the front and rear sets of small pivotal tie links in the respective directions stated is a consequence of the fact that the connection of the tie links to the segments is radially offset in the stated direction with respect to the connection of the tie links to their respective control yokes. Such tilting of the front and rear control yokes causes, through the arms 67—72 of the yokes pivotally attached to the supporting plates 20, 21, 22 an inward movement of the large segment assemblies 13, 14, 15. As the large segment assemblies move radially inwardly after the key segment assemblies, their motion is guided and controlled by the rotation of the front and rear spiders 33, 32 about the central hub 23 of the drum. The rear spider 32 is caused to rotate in a clockwise direction by the collapsing movement while the front spider 33 is caused to rotate in a counter-clockwise direction. The large segment assemblies are further guided and steadied on a purely radial path during the collapsing movement by their respective guide sleeves 141, 142, 143 sliding on the various radial guide studs 135, 136, 149 extending radially from the hub 23. In the final collapsed position the drum assumes a compact form with the key segment assemblies 10, 11, 12 drawn close to the hub 23 and nested within the large segment assemblies 13, 14, 15 which are drawn thereover.

The expanding operation is the reverse of the foregoing. Fluid pressure for the expanding movement is supplied from the annular passageway 124 within the machine shaft 24 to the opening 123 in the end face of the hub 23 and into the internal passageway 125 passing through the hub 23 to the distributor block 126, and thence through external lines 127, 128, 129 to the rear ends of the operating cylinders 100, 101, 102. This causes the piston rods 106, 107, 108 and attached segment supporting plates 17, 18, 19 to move radially outwardly. The resulting outward movement of the key segment assemblies 10, 11, 12 causes, through the rear small pivotal tie links 73, 74, 75 and the front tie links 82, 83, 84 a tilting movement of the rear control yokes 49, 50, 51 and of the front control yokes 55, 56, 57 in a reverse direction compared to the tilting that took place during the collapsing movement. The tilting movement of the control yokes communicates to the large segment assemblies 13, 14, 15 an outward radial movement, while the inner and outer rotary spiders or collars 32, 33 rotate about the hub 23 in a reverse direction compared to the rotation that took place during the expanding movement.

Figure 15:
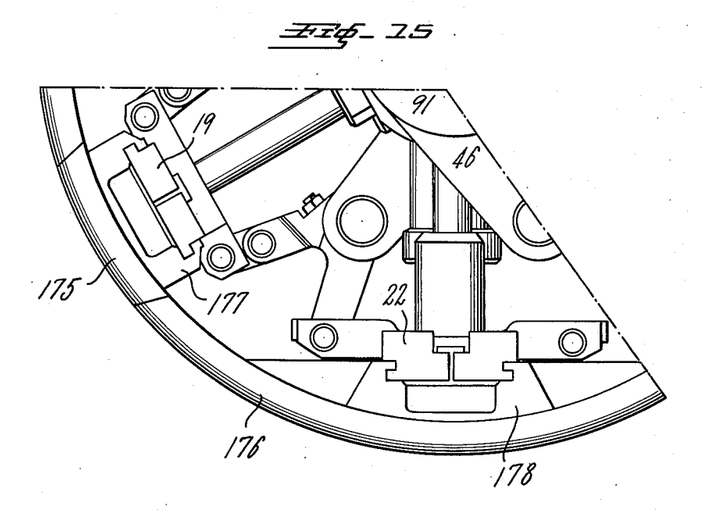
Figure 16:
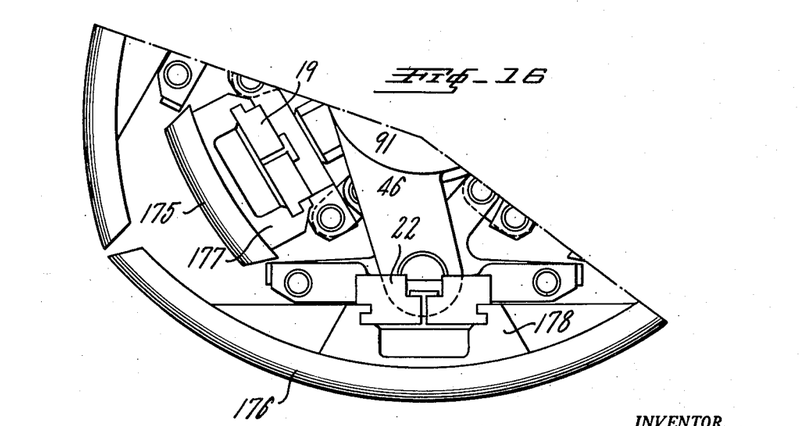

As the segments approach the expanded position, the centers of the pivotal connections 52—54 and 58—60 of the spider arms to the control yokes pass over-center or by-center with respect to a center line drawn from the axis of the drum through the center of the pivotal connection between the control yokes and the supporting plates 20, 21, 22 of the larger segment assemblies. Shortly after the spiders thus travel over-centers the stops on the spiders, such as stop 41, contact the fixed stops 42, 43 on the hub 23, and the various segments are thereby definitely positioned in the final expanded condition. Because the pivotal connection of the spiders to the control yokes has moved over-center immediately before the spiders have contacted their respective stops, the segments become firmly locked in place. As a result of the over-center travel of this pivotal point, the initial collapsing movement of the key segments 10, 11, 12 does not immediately produce collapsing movement of the larger segments 13, 14, 15, since the larger segments do not move inwardly on the collapsing cycle until the spiders 32, 33 move away from their stops for a distance equal to the by-center travel that took place at the end of the expanding cycle. This delayed movement of the larger segment assemblies with respect to the key segment assemblies, allows the key segments to move clear before the larger segments start their collapsing movement. By this arrangement, segment halves with comparatively deeply radially extending portions may be mounted on the segment supporting plates, for building tires or other objects with radially extending portions at their marginal edges, without interference of the segments during the collapsing cycle. The arrangement described permits an unusually high degree of collapse, that is, the disparity between the expanded diameter of the drum and the collapsed diameter is greater than is usual with conventional types of drum. The compactness of the collapse made possible with the present drum also makes it feasible to vary the external diameter of the building drum, or the shape of the working surfaces of the drum.

to a greater extent than has heretofore been considered practicable. Thus, referring to Figs. 15 and 16, the original segments, such as segments 12 and 15 (Fig. 1), may be replaced by segment members 175 and 176, the outer surfaces of which are spaced a greater radial distance from the center of the drum than were the working surfaces of the original segments 12 and 15, thereby constituting a building drum of larger diameter without any necessity for changing the collapsing mechanism per se. The new segments 175 and 176 have correspondingly larger supporting portions 177 and 178, respectively, which are slidably mounted on their respective supporting plates 19 and 22, in the same manner that the original smaller segments 12 and 15 were mounted thereon. In the collapsed position, shown in Fig. 16, the segments overlap in a compact arrangement without interference with each other.

Because the collapsing mechanism described provides for purely radial rectilinear collapsing motion of the segments, the present drum is particularly adapted for forming objects, such as rubber barrels or the like, having internal ribs running lengthwise or circumferentially, and there is no difficulty about collapsing the drum and removing such objects without distortion or injury to the product.

It is also important to note that the invention provides, during the collapsing and expanding movement of the segments, radial guides for the key segments in the form of the radial actuating cylinders, and radial guides for the larger segments in the form of the radial telescoping stud and sleeve arrangements. Such radial guiding means play little or no part as a driving medium between the hub and the segments as the drum rotates on the machine shaft, since the pivotal guide linkages in the form of the rotary spiders and tilting control yokes transmit essentially all of the rotating driving force. Therefore, the rotation of the drum, and sudden starting and stopping of the drum, or sudden reverse rotation of the drum, have substantially no tendency to distort or displace the radial guides for the segments. Hence, the drum remains true and accurate with respect to its expanding and collapsing movement even after comparatively long periods of use.

Another advantage of the construction shown is that each segment is attached to adjacent segments at supporting points diagonally spaced toward opposite ends of the segments. Because of this arrangement, each segment is effectively connected to the adjacent segment on either side of it, so that no one segment can contract or expand without the adjacent segment doing likewise. Another advantage of this arrangement is that the various parts may be made alike, that is, there need be no right-hand and left-hand parts, and corresponding parts are always inter-changeable.

Since the expanding and collapsing movement is effected by three separate radial cylinders, each attached directly to one of the key segments, movement of the segments is directly effected in a rapid and positive manner with a comparatively small amount of power and with a minimum of wear and strain on the collapsing mechanism. This arrangement permits a most compact collapse, and it will also be seen that the expanding and contracting motion is entirely independent of any rotary motion of the drum, so that starting, stopping, and reversal of rotation of the drum have no tendency to cause undesired collapse of the segments.

The stops provided on the rotary spiders and hub provide for rigid locking of the drum in the expanded position. These stops are so located at the pivotal connection between the spider arms and the control yokes travels by-center toward the end of the expanding movement, with the result that the larger segments actually move inwardly a small amount at the end of the expanding cycle, causing them to bear firmly against the key segments, which are being urged outwardly by the actuating cylinders. Therefore, while the spider stops rest against the hub stops no part of the collapsing mechanism can move, with the result that the drum rotates as a firmly rigid unit with no side thrust or strain on operating linkages of the collapsing unit. For this reason, the drum is enabled to maintain its expanded position with unusual accuracy, even after the drum has been in use for comparatively long periods of time.

Having thus described my invention, what I claim and desire to protect by Letters Patent is:

1. A collapsible building drum comprising in combination a plurality of arcuate segments defining a circular building surface, a central axial supporting hub within said segments, and radially extending actuating means movable in a purely radial direction attached between said segments and said hub for collapsing and expanding said segments.

2. A collapsible building drum comprising in combination a plurality of arcuate segments defining a circular building surface, a central axial supporting hub within said segments, and radially extending fluid actuated cylinders attached between said segments and said hub for collapsing and expanding said segments.

3. A collapsible building drum comprising in combination a plurality of arcuate segments defining a circular building surface, a central axial supporting hub within said segments, radially extending actuating means movable in a purely radial direction attached to some of said segments and said hub for collapsing and expanding said some segments, and pivotal linkages connecting said some segments to the remaining segments for collapsing and expanding the remaining segments.

4. A collapsible building drum comprising in combination a plurality of arcuate segments defining a circular building surface, a central axial supporting hub within said segments, radially extending fluid actuating cylinders attached to some of said segments and said hub for collapsing and expanding said some segments, and pivotal linkages connecting said some segments to the remaining segments for collapsing and expanding the remaining segments.

5. A collapsible building drum comprising in combination a plurality of arcuate segments defining a circular building surface, a central axial supporting hub within said segments, radially extending actuating means movable in a purely radial direction attached to some of said segments and to said hub for collapsing and expanding said some segments, pivotal linkages connecting said some segments to the remaining segments for collapsing and expanding the remaining segments, and radially telescoping guides attached between the remaining segments and the hub for limiting the collapsing and expanding movement of said remaining segments to purely radial movement.

6. A collapsible building drum comprising in combination a plurality of arcuate segments defining a circular building surface, a central axial supporting hub within said segments, radially extending actuating means movable in a purely radial direction attached to some of said segments and to said hub for collapsing and expanding said some segments, pivotal linkages connecting said some segments to the remaining segments for collapsing and expanding the remaining segments, rotary collars mounted on said hub, said pivotal links being pivotally connected to said rotary collars for guiding the collapsing movement of said remaining segments.

7. A collapsible building drum comprising in combination a set of arcuate key segments, a set of alternately disposed arcuate larger segments, a central axial supporting hub within said segments, and a radially extending fluid actuated cylinder attached between each segment of one of said sets of segments and the hub for collapsing and expanding said segments.

8. A collapsible building drum comprising in combination a set of arcuate key segments, a set of alternately disposed arcuate larger segments, a central axial supporting hub within said segments, a radially extending fluid actuated cylinder attached between each of said key segments and said hub for collapsing and expanding said key segments, and pivotal linkages connecting said key segments to said larger segments for collapsing and expanding said larger segments with said key segments.

9. A collapsible building drum comprising in combination a set of arcuate key segments, a set of alternately disposed arcuate larger segments, a central axial supporting hub within said segments, a radially extending fluid actuated cylinder attached between said key segments and said hub for collapsing and expanding said key segments, pivotal linkages connecting said key segments to said larger segments for collapsing and expanding said larger segments with said key segments, rotating guiding means mounted on said hub, said pivotal linkages being pivotally attached to said rotating guiding means to guide the collapsing and expanding movement of said larger segments.

10. A collapsible building drum comprising in combination a set of arcuate key segments, a set of alternately disposed arcuate larger segments, a central axial supporting hub within said segments, a radially extending fluid actuated cylinder attached between said key segments and said hub for collapsing and expanding said key segments, pivotal linkages between said key segments and said larger segments for collapsing and expanding said larger segments, rotary guiding means mounted on said hub, said pivotal linkages being pivotally joined to said rotary guiding means for controlling the collapsing and expanding movement of said larger segments, and radially telescoping guide means attached between said larger segments and said hub.

HOLLIS C. HODGKINS.

References Cited in the file of this patent
UNITED STATES PATENTS

| Number | Name | Date |
|---|---|---|
| 924,036 | Burgess | June 8, 1909 |
| 1,140,771 | Schur | May 25, 1915 |
| 1,275,790 | Taylor | Aug. 13, 1918 |
| 1,434,567 | Smith et al. | Nov. 7, 1922 |
| 1,454,995 | Denmire | May 15, 1923 |
| 1,877,746 | Heston et al. | Sept. 13, 1932 |
| 2,201,469 | Bostwick | May 21, 1940 |